United States Patent
Yamanaka

[11] Patent Number: 6,105,809
[45] Date of Patent: Aug. 22, 2000

[54] LID MOUNTING STRUCTURE OF VESSEL

[75] Inventor: Shigehiro Yamanaka, Osaka, Japan

[73] Assignee: Peacock Company, Limited, Osaka, Japan

[21] Appl. No.: 09/198,894

[22] Filed: Nov. 24, 1998

[51] Int. Cl.[7] .............................. B65D 45/16; A47J 31/00
[52] U.S. Cl. .................... 220/326; 220/836; 220/592.16; 220/592.27; 222/209; 99/312; 16/257
[58] Field of Search ........................ 220/592.27, 592.17, 220/592.16, 592.18, 254, 255, 256, 259, 315, 324, 836, 840–844, 326, 833–835; 99/312; 222/401, 400.8, 131, 209, 556, 383.1, 385, 321.8, 321.7, 321.1; 16/232, 255, 257, 258, 259, 380, 386, 261, 267

[56] References Cited

U.S. PATENT DOCUMENTS

| | | | |
|---|---|---|---|
| 2,974,354 | 3/1961 | Matuzas | 16/257 |
| 3,406,995 | 10/1968 | McCarthy | 16/257 |
| 4,116,366 | 9/1978 | Takenakashima et al. | 222/401 X |
| 4,189,061 | 2/1980 | Yu | 220/326 |
| 4,470,517 | 9/1984 | Carrier | 220/836 |
| 4,589,567 | 5/1986 | Pircher | 220/326 |
| 4,622,889 | 11/1986 | Chappell et al. | 222/209 X |
| 5,146,650 | 9/1992 | Robertson | 16/259 |

*Primary Examiner*—Nathan J. Newhouse
*Attorney, Agent, or Firm*—Moonray Kojima

[57] ABSTRACT

A lid mounting structure for opening/closing and connecting/disconnecting the lid of, e.g. a pot, thermos bottle, electronic jar, and the like, wherein are provided a fastening unit and a bearing unit engaged with each other and formed at the periphery of the mouth of the vessel to which the lid is mounted; a spindle held in the bearing unit and inserted in a groove formed in the fastening unit; a fastening member disposed in the fastening unit for fastening the spindle inserted in the groove and for preventing extraction of the spindle; and an urging device provided in direction of fastening of the fastening member to the spindle inserted in the groove; thereby to securely prevent falling off of the lid from the mouth when the lid is turned, and to enable easy simple operation of connecting and disconnecting the lid from the vessel.

10 Claims, 8 Drawing Sheets

LID MOUNTING STRUCTURE OF VESSEL

BACKGROUND OF THE INVENTION

1. Field of the Invention

The present invention concerns a lid mounting structure of vessel for opening/closing and connecting/disconnecting the lid of pot, thermos bottle, rice cooker, cooking pan, electronic jar, heat-cold insulating vessel, etc.

2. Description of the Prior Art

Figure 8:
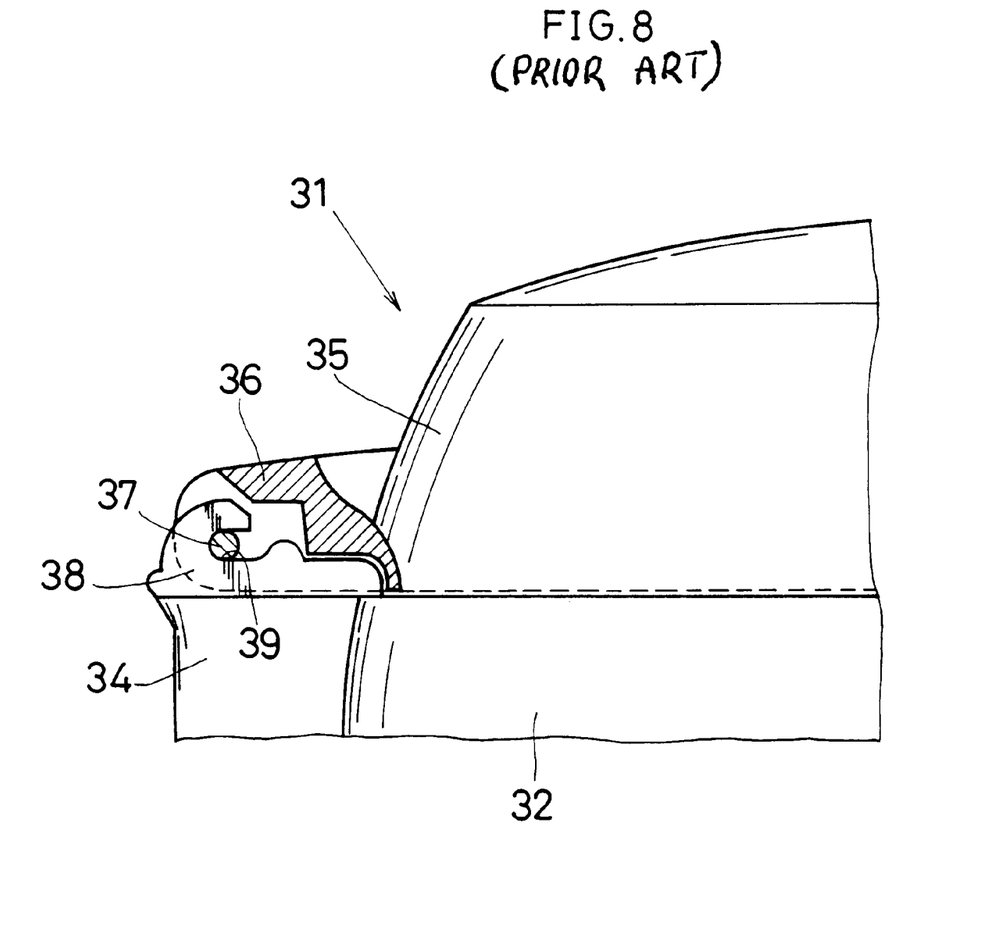
FIG. 8 is a partial side view showing a conventional lid mounting structure.

Conventionally, there exists, as lid mounting structure of vessel, a structure realized, as shown in FIG. 8, in a way to insert, when mounting a lid 35 on the mouth, 34 of the vessel body 32 constituting a pot 31, the spindle 37 of a bearing unit 36 formed on the outer circumferential face on the rear end side of the lid 35 obliquely from above in a groove 39 provided in a fastening unit 38, fasten it, and then mount the lid 35 in a way to be opened and closed around the spindle 37.

However, with this mounting structure, which is a simple structure for just fastening the spindle 37 on the lid 35 side in the groove 39 of the fastening unit 38, it sometimes happens that the lid 35 falls off from the mouth 34 because, when the lid 35 is turned in the opening or closing direction, the spindle 37 fastened in the groove 39 moves in the longitudinal direction and this reduces the amount of fastening between the groove 39 and the spindle 37.

On the other hand, in the case where this amount of fastening between the groove 39 and the spindle 37 is increased, a problem is that while it serves to prevent falling off of the lid 35, it becomes difficult to insert the spindle 37 in the groove 39 or extract the spindle 37 from the groove 39 and, as a result, it takes much trouble and time for connection and disconnection of the lid 35.

Moreover, another problem is that, since the spindle 37 is fastened in the groove 39 of the fastening unit 38, the stress produced at the time of turning of the lid 35 is directly applied to the groove 39, either causing crack or fissure in the groove 39 or breaking the groove 39.

SUMMARY OF THE INVENTION

The main object of the present invention is to provide a lid mounting structure of vessel realized by engaging a fastening unit formed in the mouth and a bearing unit formed in the lid with each other, in a way to insert a spindle held in the bearing unit in the groove formed in the fastening unit and then hold the spindle inserted in the groove by fastening it with a fastening member so as to securely protect the lid against falling off from the mouth, at the time of turning of the lid, and also realized in a simple structure of just turning the fastening member to the fastening position where the spindle is fastened and the releasing position where the spindle is released, so that the connection and disconnection of the lid may be performed easily with simple operation.

Another object of the present invention is to provide a lid mounting structure of vessel realized in a way to insert, between the opposing faces of walls on both sides formed on the bearing unit, walls on both sides formed on the fastening unit and fasten a spindle facing the space between the walls on both sides on the fastening unit, making it possible to prevent the walls on the bearing unit and the fastening unit from coming in contact with each other, avoid direct application of the stress produced at the time of turning of the lid to the fastening member and securely prevent breaking of or damage to the fastening member, so as to stably obtain fastening function by the fastening member and improved durability.

Still another object of the present invention is to provide a lid mounting structure of vessel constructed in such a way that, when the lid is turned in the opening direction, a control wall formed in the bearing unit comes either close to or in contact with the end part on the fastening side of the fastening member fastening the spindle to prevent the fastening member from turning in the releasing direction, thus making it impossible for the spindle to be extracted from the groove and securely preventing falling off of the lid.

Yet another object of the present invention is to provide a lid mounting structure of vessel constructed in a way to load an elastic member in compressed state between the opposing faces of the fastening unit and the fastening member, so as to facilitate the assembling and replacement of the elastic member and thus improve the workability.

A further object of the present invention is to provide a lid mounting structure of vessel constructed in a way to put, when mounting the lid, a spindle held in the bearing unit in contact with the guide face of the fastening member fit in the fastening unit, so that the fastening member turns in the releasing direction and the spindle is guided for insertion in the groove formed in the fastening section, thus eliminating the trouble of separately turning the fastening member by either hand fingers or operating tool, etc. and enabling simple and easy lid mounting work.

A still further object of the present invention will be easily clarified from the description or the embodiment explained hereafter.

DESCRIPTION OF THE PREFERRED EMBODIMENT

An embodiment of the present invention will be described in detail based on drawings hereafter.

Figure 1:
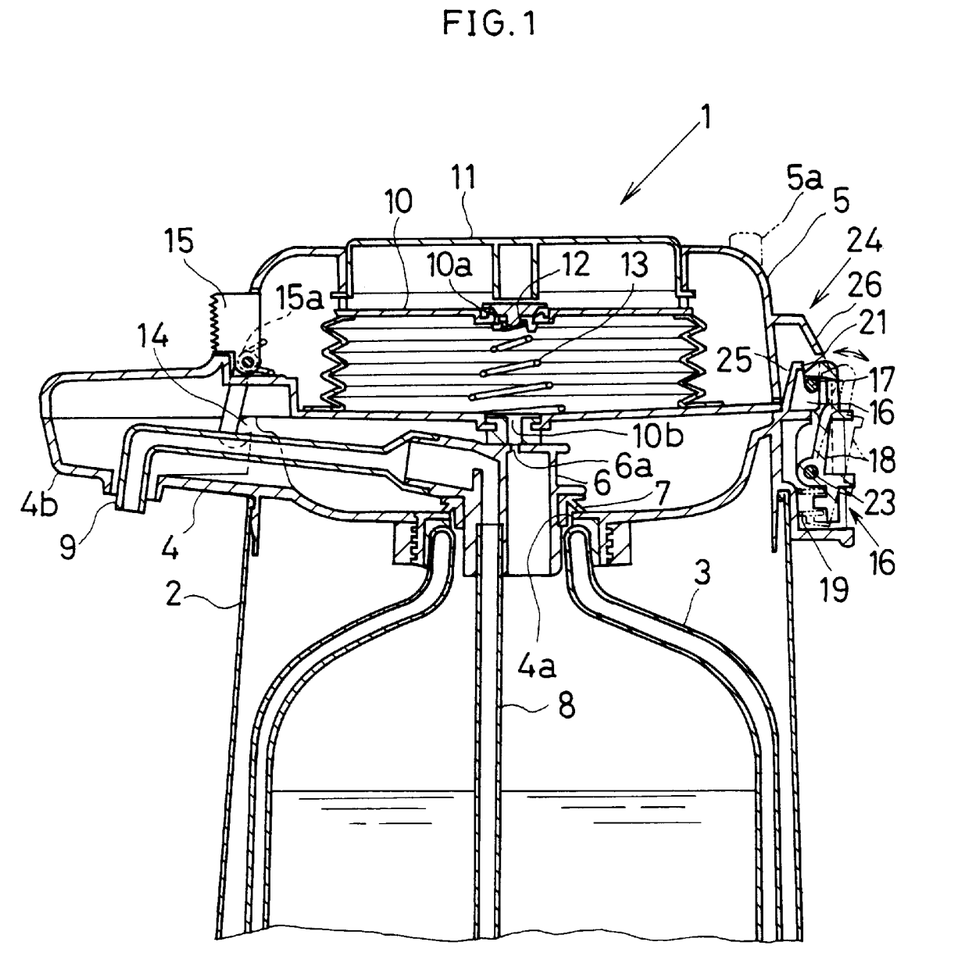
FIG. 1 is a sectional side elevation shoving the lid mounting structure of vessel according to the present

The drawings show the lid counting structure of vessel and, in FIG. 1, the pot 1 is constructed with vessel body 2, inner vessel 3, mouth 4 and lid 5.

A bottomed inner vessel 3 is housed inside the vessel body 2, a mouth 4 is fit and fixed to the periphery on the open side of the vessel body 2 and the inner vessel 3, a lid 5 is rotatably mounted on the periphery at the rear end of the mouth 4, and a handle 4c (see FIG. 5) is rotatably mounted at both edges of the mouth 4.

The mouth 4 is fit and fixed to the periphery on the open side of the vessel body 2 and the inner vessel 3 in a state maintaining airtightness and fluid-tightness, and a plug 6 communicating with the inner vessel 3 is inserted from above in the opening 4a formed at the center of the mouth 4, while a seal 7 attached to the outer circumferential face of the plug 6 is placed in close contact with the periphery of the opening 4a for closing.

On the other hand, a suction tube 8 connected to the lower part of the plug 6 is placed close to the bottom of the inner vessel 3 and formed with a length and a bore size capable of sucking the liquid stored at the bottom or the inner vessel 3. A discharge tube 9 connected to the upper part of he plug 6 is made to protrude downwardly and obliquely against the bottom face of the projection 4b formed on the front end side of the mouth 4.

In the lid 5 is incorporated an air pump 10 constituted by bellows type pump or other pump, and this air pump 10 is realized in such a way that, when the operating unit 11 is pressed down, a valve disc 12 mounted at the center on the bottom face side of that operating unit 11 is put in close contact with-the air inlet port 10a formed at the center on the top face side of the plug 6, to close the air inlet port 10a.

On the other hand, since a discharge port 10b formed at the center on the bottom face of the pump 10 is made to communicate with a hole 6a formed at the center on the top face of the plug C, compressed air is supplied into the inner vessel 3 with a compressing motion of the air pump 10 and, under the pressure of the compressed air, the liquid (hot water, cold water, potable water, etc., for example) stored in the inner vessel 3 is poured to outside the pot 1 through the suction tube 8 and discharge tube 9 of the plug 6.

As the pressing down of the operating unit 11 is released, the air pump 10 returns to its initial state with the elasticity of the built-in elastic member 13 (coil spring in the embodiment), and the air inlet port 10a is opened.

The opening/closing lever 5a provided in protection at the center on the rear face side of the lid 5 is turned for selecting either pouring or stop and, when the lever 5a is turned to the OPEN (pour) position, it becomes possible for the operating unit 11 to be pressed down, while when the lever 5a is turned to the CLOSE (stop Position, either pour or stop may be selected as required because pressing down of the operating unit 11 is prevented.

Figure 2:
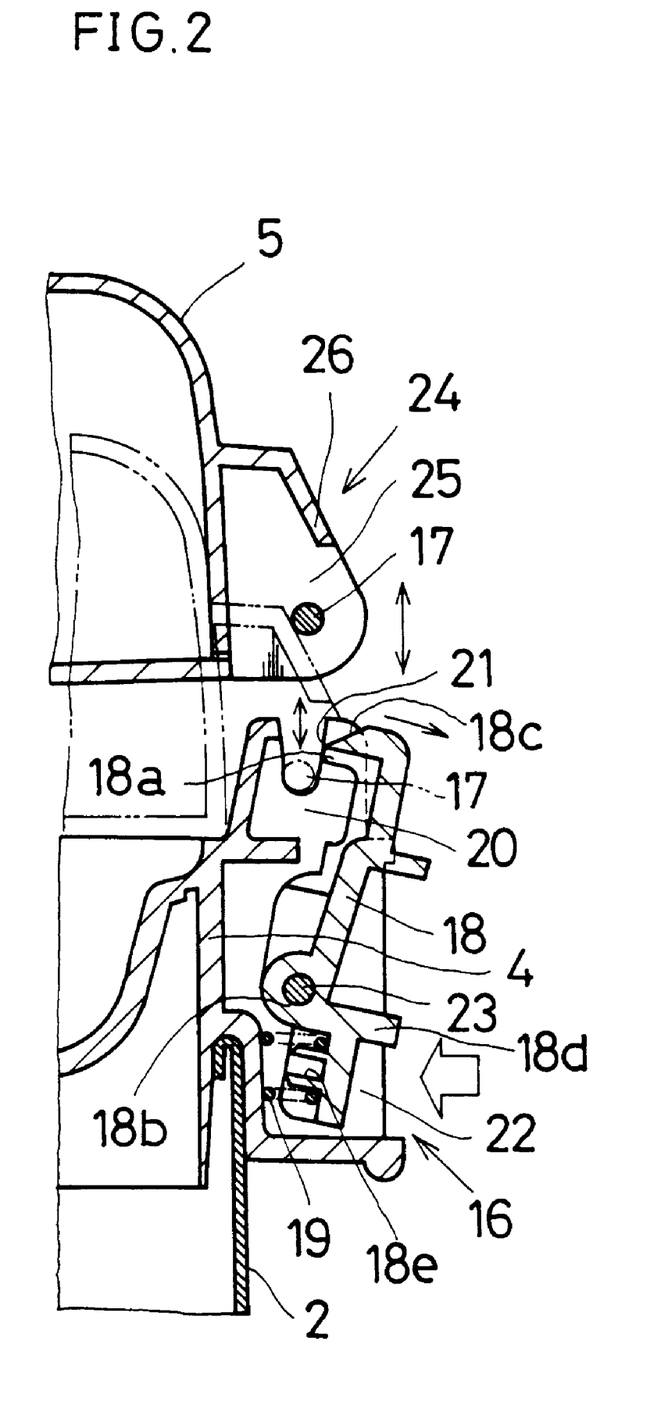
FIG. 2 is a sectional side elevation showing the connecting and disconnecting motions of the lid and the unfastened state of the fastening lever.
Figure 3:
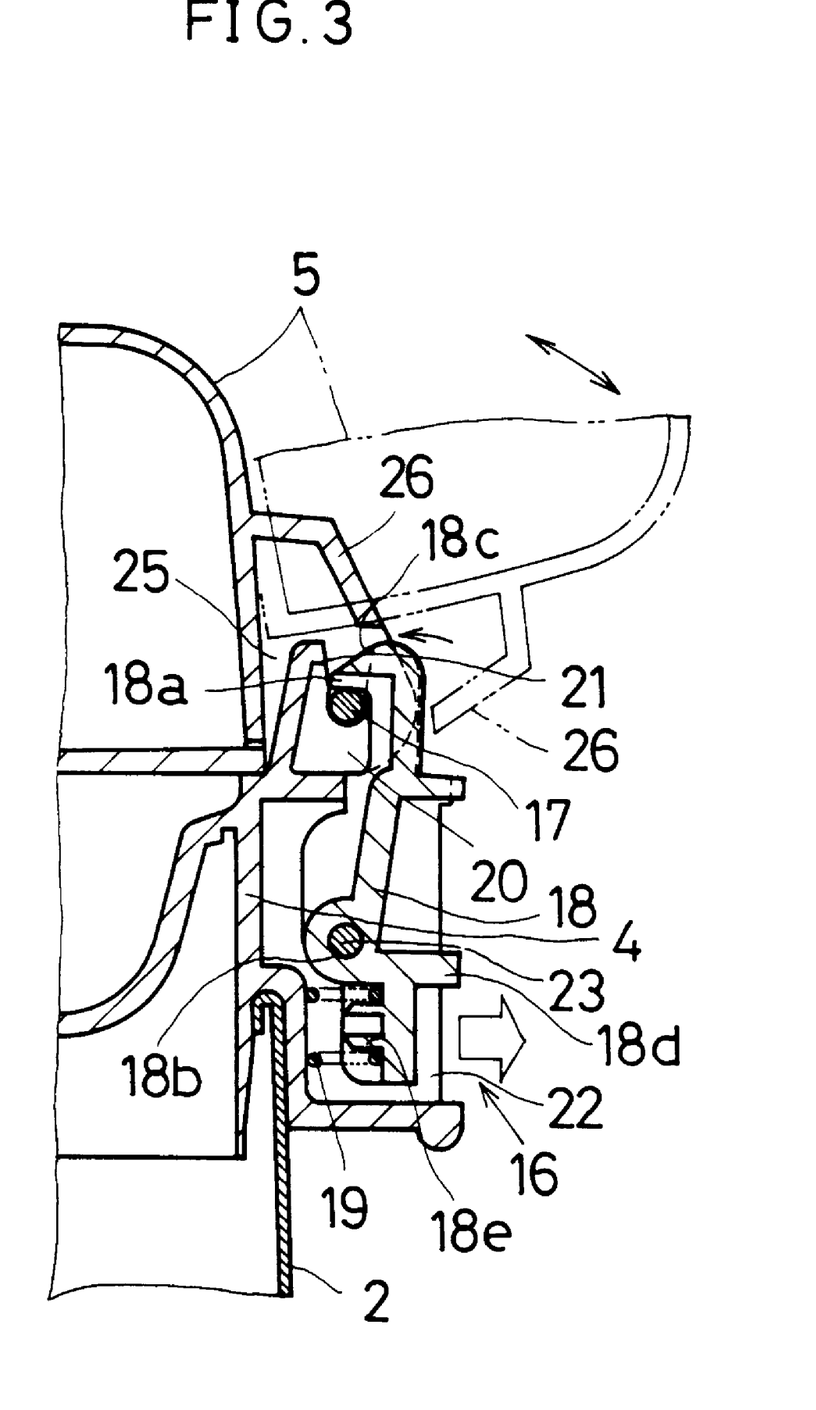
FIG. 3 is a sectional side elevation showing the turning motion of the lid and the fastened and fixed state of the fastening lever.
Figure 4:
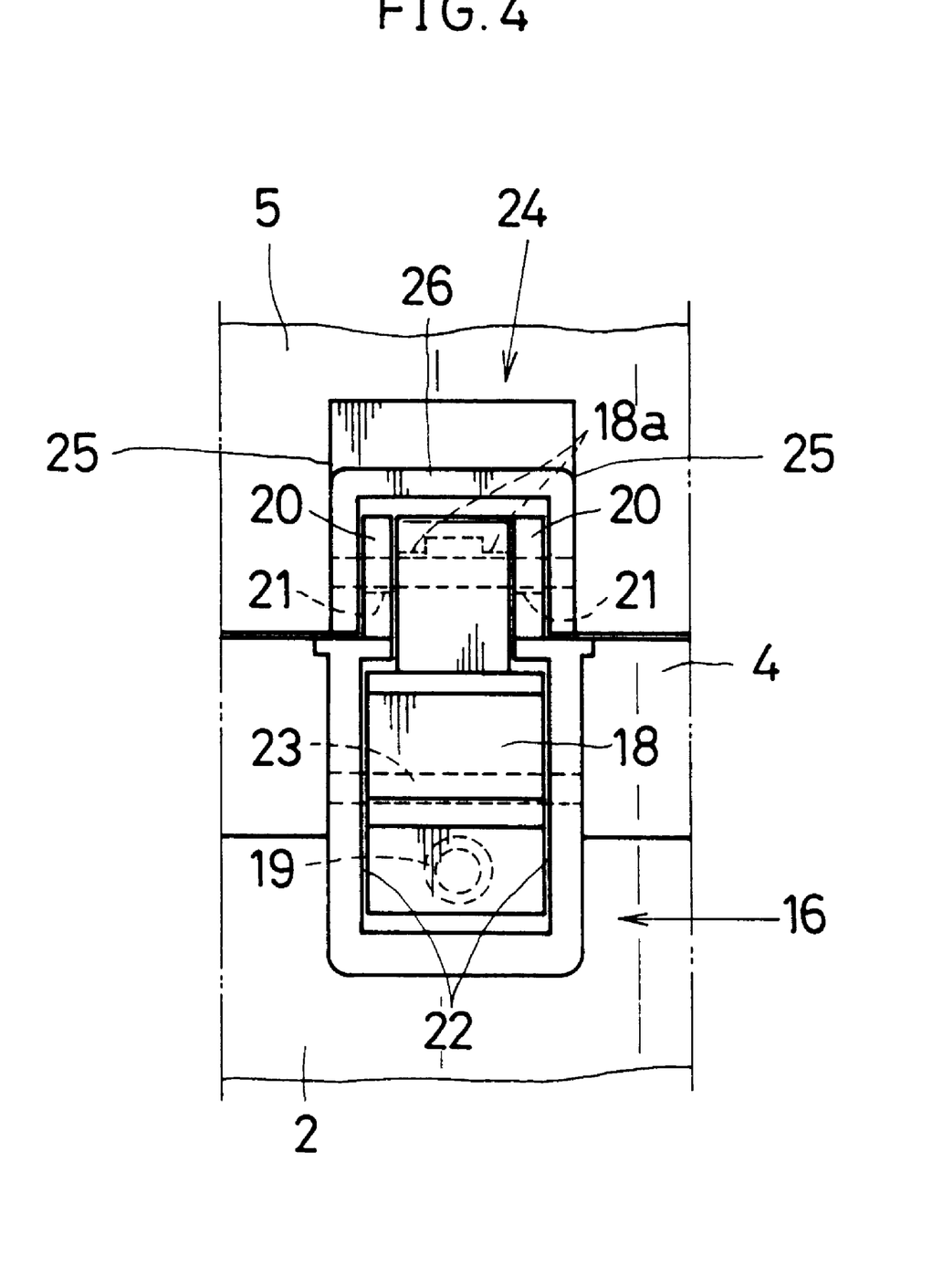
FIG. 4 is a rear elevation showing the mounted state of the spindle and the lever.

On the other hand, the mouth 4 and the lid 5 are formed in a size and a shape to be engaged with each other and, when fitting and fixing the lid 5 to the periphery on the open side of the mouth 4, a bearing unit 24 formed at the periphery on the rear end side of the lid a is engaged with a fastening unit 16 formed at the periphery on the rear end side of the mouth 4, a spindle 17 held in the bearing unit 24 is inserted in the grooves 21, 21 formed in the fastening unit 16, and then a fastening lever 18 fit in the fastening unit 16 is fastened to the spindle 17, and the lid 5 is rotatably mounted at the periphery on the rear end side of the mouth 4, as shown in FIG. 2, FIG. 3, FIG. 4. The fastening lever 18 is rotatably urged, by an elastic member 19 to be described later, in the direction to be fastened to the spindle 17.

As shown in FIG. 1, a closing lever 15 fit at the center on the front face side of the lid 5 is fastened to the fastening projection 14 formed on the front end side of the mouth 4, to unopenably fix the lid 5 and fit the mouth 4 and the lid 5 in a state engaged with each other. The closing lever 15 is rotatably urged, by an elastic member 15a such as coil spring, spiral spring, etc. (spiral spring in the embodiment), in the direction to be fastened to the fastening projection 14 of the mouth 4, and is rotatably fit to the fastening position fastened to the fastening projection 14, and the releasing position where that fastening is cancelled.

As shown in FIG. 2 to FIG. 4, on the top end side of the fastening unit 16 are formed walls 20, 20 in a way to protrude upward from the periphery on the open side of the mouth 4. The walls 20, 20 are formed upright in parallel to each other in the vertical direction across a distance in which rotation of the fastening lever 18 is allowed and a distance which can be inserted between the walls 25, 25 of the bearing unit 24 to be described later and slightly wider than the fastening lever 18, while on the opposing faces of the walls 20, 20 are formed grooves 21, 21 in which to insert the spindle 17 in parallel with each other in the vertical direction. The grooves 21, 21 are formed in a way to get gradually wider from bottom end to top end, and constituted in a shape which facilitates insertion and extraction of the spindle 17.

On the bottom end side of the fastening unit 16 are formed walls 22, 22 along the outer circumferential face on the rear end side of the mouth 4, in succession to the walls 20, 20. The walls 22, 22 are formed across a distance in which rotation of the fastening lever 15 is allowed and a distance slightly wider than the fastening lever 18, the fastening lever 18 is held between the opposing faces o the walls 22, 22 rotatably in longitudinal direction, a supporting pin 23 is inserted in the direction of width in a hole 18b formed on the bottom end side of the fastening lever 18, both ends of the supporting pin 23 being fixed by press fitting to the walls 22, 22, and, around the supporting pin 23, the fastening lever 19 is rotatably fit to the fastening position fastened to the fastening spindle 17 inserted in the grooves 21, 21 of the walls 20, 20, and the releasing position where that fastening is cancelled.

At the top end of the fastening lever 18 is integrally formed a fastening claw 18a to be fastened to the upper circumferential face of the spindle 17 inserted in the grooves 21, 21. The guide face 18c formed at that top face is formed in a shape (curved face, sloped face, for example) to guide insertion of the spindle 17 toward the grooves 21, 21, while the stepped part 18d formed on the rear face on the bottom end side is formed in a size and a shape which enable fastening by either hand fingers Aa (see FIG. 5) or operating tool (not illustrated).

An elastic member 19 such as coil spring, spiral spring, sheet spring, etc. (coil spring in the embodiment) is provided in compressed state, between the opposing faces at the bottom of the fastening unit 16 and the bottom of the fastening lever 18 corresponding to the space between the walls 22, 22, in the direction orthogonal to those opposing faces (horizontal direction), and the fastening lever 18 is urged to a state in which the fastening claw 18a is fastened to the spindle 17.

An end part of the elastic member 19 is fastened to a projection 18e formed at the bottom end of the fastening lever 18, to prevent displacement of the loading position of the elastic member 19, at the time of rotation of this lever 18. Moreover, it is also all right to form or assemble the elastic member 19 integrally to the bottom end of the fastening lever 18.

On the bearing unit 24 are formed walls 25, 25 protruding in the rear direction from the outer circumferential face on the rear end of the lid 5. The walls 25, 25 are formed across a distance in which insertion and rotation of the walls 20, 20 formed on the fastening unit 16 are allowed and at a height where rotation of the walls 20, 20 is allowed centering around the spindle 17, while on the top end side of the walls 25, 25 is formed a control wall 26 which comes either close to or in contact with the rear face on the top end side of the fastening lever 16 fastening the spindle 17.

Namely, when the lid 5 is turned in the opening direction around the spindle 17 fastened in the grooves 21, 21 as shown in FIG. 3, the control wall 26 comes either close to or in contact with the rear face on the top end side of the fastening lever 18 fastening the spindle 17, making it impossible for the spindle 17 to be extracted front the grooves 21, 21 and thus securely preventing the lid 5 from falling off.

On the opposing faces of the walls 25, 25 is held the spindle 17. The spindle 17 is formed with a shaft diameter which facilitates insertion and extraction of he walls 20, 20 in and from the grooves 21, 21 and in a sectional shape (circular, elliptical shape, for example) which enables smooth and easy rotation of the lid 5.

The illustrated embodiment is constructed as described above, and its actions will be explained hereafter.

Figure 6:
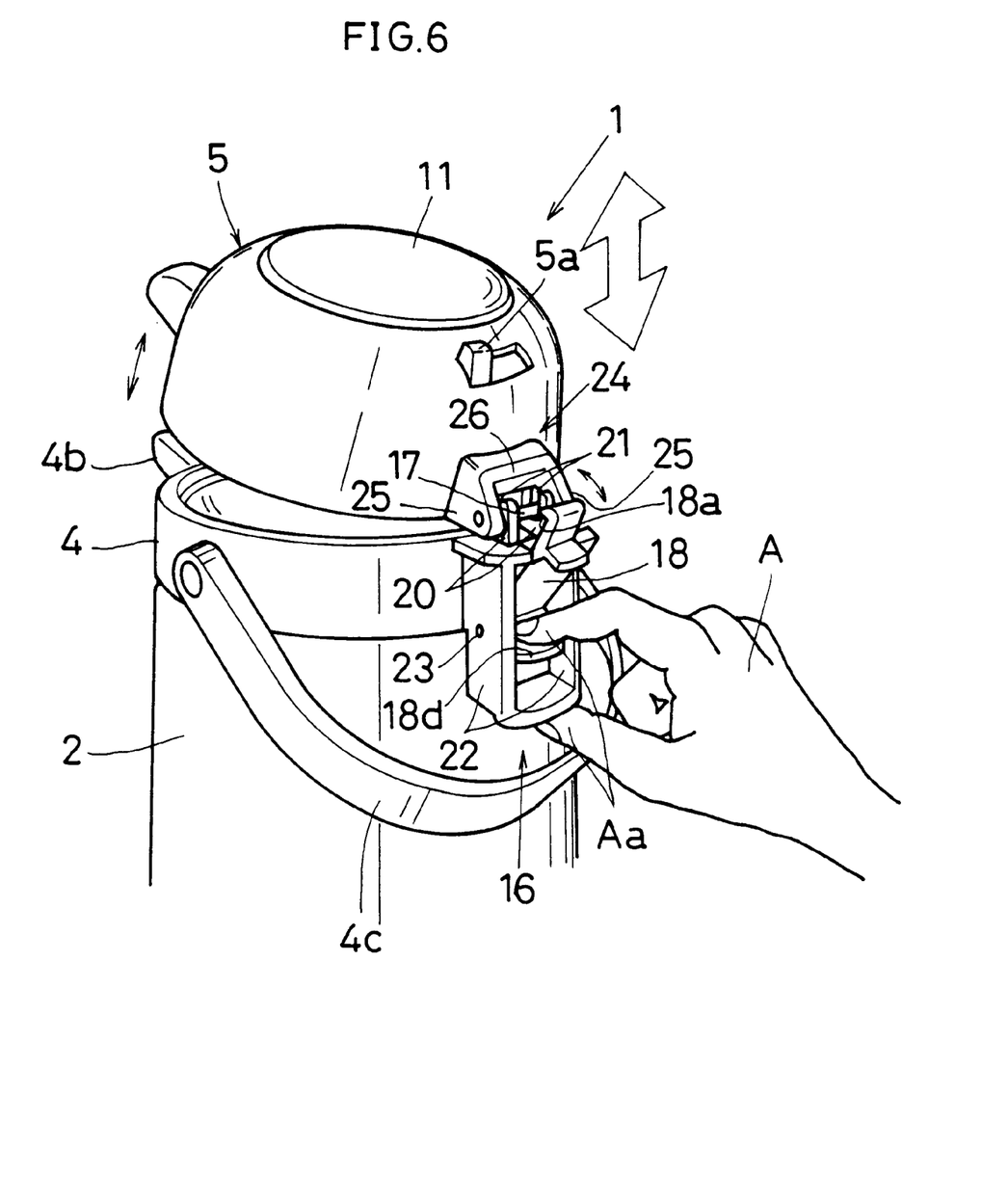
FIG. 6 is a perspective view showing the fitting state of the lid.

In the first place, to remove the lid 5, press the closing lever 15 (see FIG. 1) of the lid 5 with fingers Aa of hand A in the releasing direction against the elastic member 15a, remove the closing lever 15 from the fastening projection 14 of the mouth 4 to cancel the fastening, and then hold and turn the fastening lever 18 fit in the fastening unit 16 of the mouth 4 with either fingers Aa of hand A or an operating tool (not illustrated) as shown in FIG. 6.

In the turning operation of the fastening lever 18, after fastening fingers Aa of hand A at the bottom end of the fastening unit 16 and fastening fingers Aa of hand A at the stepped part 18d of the fastening lever 19, turn the fastening lever 18 in the releasing direction against the elastic member 19 around the supporting pin 23, and the fastening claw 18a of the fastening lever 18 will retreat, as shown in FIG. 2, from a position on the upper circumferential face of the spindle 17 inserted in the grooves 21, 21 formed in the walls 20, 20 or the fastening unit 16 and behind the grooves 21, 21, and the fastening of the fastening lever 18 on the spindle 17 will be cancelled. Moreover, it is also all right to directly press the bottom end side of the fastening lever 19 with the fingers Aa of hand A.

Figure 5:
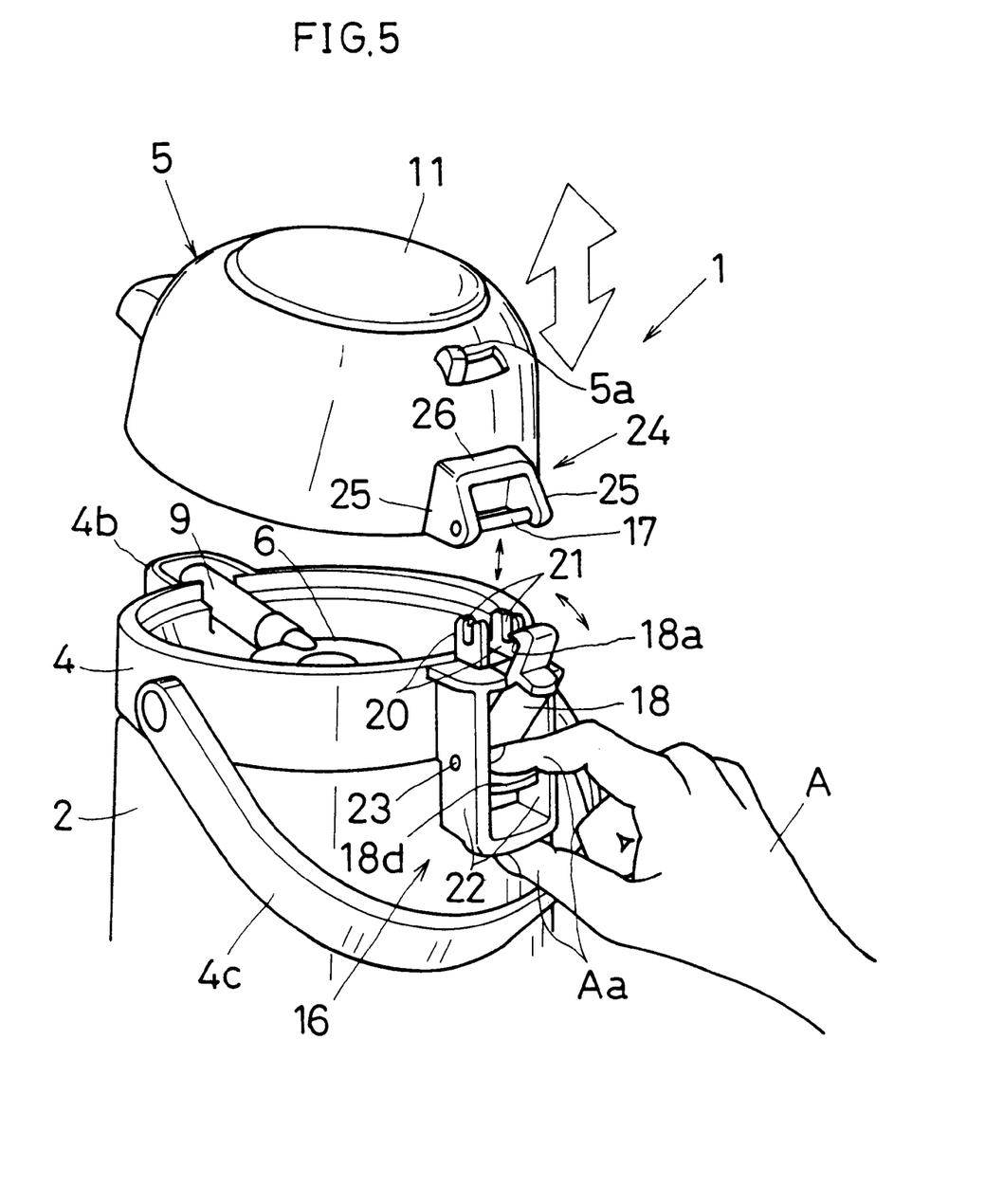
FIG. 5 is a perspective view showing the connecting and disconnecting states of the lid.

After that, lift the entire lid 5 upward while maintaining the cancelled state of the fastening lever 18 and, as shown in FIG. 5, extract the spindle 17 from the grooves 21, 21, and the lid 5 can be removed from the mouth 4.

If the lid 5 is removed, the cleaning and sterilization of the vessel body, 2, inner vessel 3 and mouth 4 can be performed easily without being disturbed by the lid 5. Moreover, the lid 5 can be cleaned and sterilized independently of other parts. The injection and discharge of liquid in the inner 3 can also be made easily.

Next, co replace the lid 5, follow the above-described procedure in the opposite order. Namely, hold and turn the fastening lever 18 fit in the fastening unit 16 of the mouth 4 with either fingers Aa of hand A or an operating tool and, as shown in FIG. 2 and FIG. 5, make the fastening claw 18a of the fastening lever 18 retreat no a position behind the grooves 21, 21 formed in the walls 20, 20 of the fastening unit 16, where insertion of the spindle 17 in the grooves 21, 21 is allowed.

Vertically lower the lid 5 while maintaining this state, insert the walls 20, 20 on the fastening unit 16 side of the mouth 4 between the walls 25, 25 on the bearing unit 24 side of the lid 5, insert the spindle in the grooves 21, 21 of the walls 20, 20 and cancel the holding with fingers Aa of hand A or an operating tool to make the fastening lever 18 return in the fastening direction with the elasticity of the elastic member 19. This will fasten the fastening claw 18a of the fastening lever 18 to the spindle 11 inserted in the grooves 21, 21, as shown in FIG. 3, and slidably fit the spindle 17, for protection against falling, in the grooves 21, 21 formed in the walls 20, 20 of the fastening unit 16.

Moreover, since the spindle 17 is inserted in the grooves 21, 21 from above, this can prevent the spindle 17 from moving forward and backward, thus securely preventing any play or displacement of the lid 5.

Figure 7:
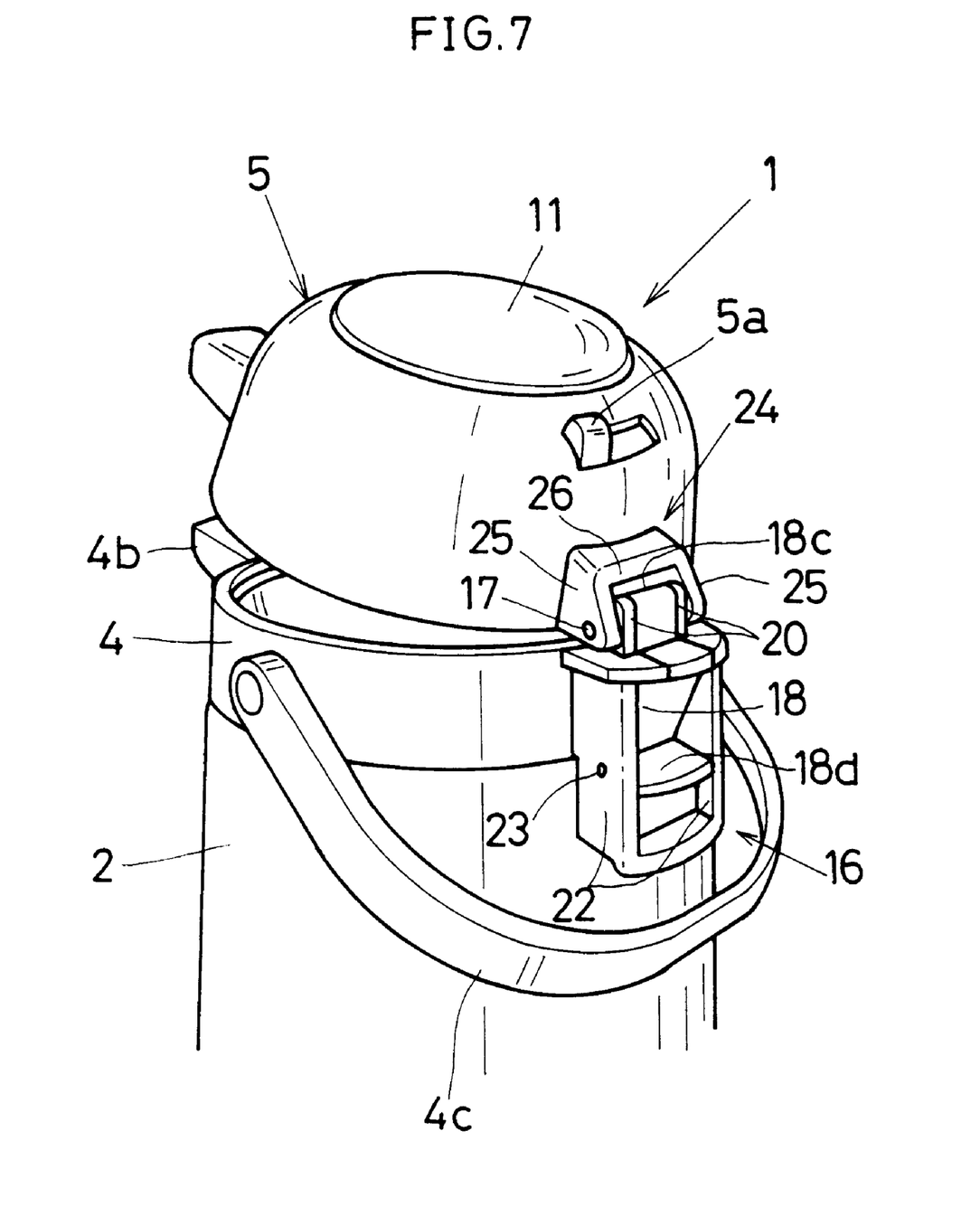
FIG. 7 is a perspective view showing the engaged state of the lid and the fastened state of the lever.

Next, turn the lid 5 in the closing direction (forward direction) around the spindle 17, fit the lid 5 to the periphery on the open side of the month 4 and fasten the closing lever 15 of the lid 5 to the fastening projection 14 of the mouth to fix the lid 5 not to be opened, and the mouth 4 and the lid 5 will be fit in a state engaged with each other, as shown in FIG. 7.

Furthermore, as the spindle 17 held in the bearing unit 24 of the lid 5 is put in contact with the guide face 18c of the fastening lever 18 fit in the fastening unit 16 of the mouth 4, the fastening lever is turned in the releasing direction against the elastic member 9 and the spindle 17 is guided for insertion in the grooves 21, 21 and, for that reason, it becomes possible to mount the lid 5 easily by simple operation with no need of turning the fastening lever 18 with fingers Aa of hand A or an operating tool.

On the other hand, when the lid 3 is turned in the opening direction (rear direction), around the spindle 17, the control wall 26 formed on the bearing unit 24 of the lid 5 cones either close to or in contact with the rear face on the top end side of the fastening lever 19 fastening the spindle 17.

For that reason, even when an attempt is made to turn the fastening lever 18 in the releasing direction, the rotation is prevented because the top end of the fastening lever 19 comes either close to or in contact with the control wall 26 and the fastening state of the fastening lever 18 is maintained, thus making it impossible for the spindle 17 to be extracted from the grooves 21, 21 and securely preventing falling off of the lid 5.

As described above, by engaging the bearing unit 24 of the lid 5 with the fastening unit 16 of the mouth 4, inserting the spindle 17 held at the walls 25, 25 of the bearing unit 24 from above in the grooves 21, 21 formed in the walls 20, 20 of the fastening unit 16 and fastening the fastening lever 18 to the spindle 17 inserted in the grooves 21, 21 to protect against falling, it becomes possible to securely prevent falling off of the lid 5 from the mouth 4, at the time of turning of the lid 5.

Moreover, thanks to a simple structure of just turning the fastening member 18 to the fastening position where it is fastened to the spindle 17 and the releasing position where that fastening is cancelled, the connection and disconnection of the lid can be performed easily with simple operation.

Furthermore, since the spindle 17 is inserted in the grooves 21, 21 of the fastening unit 16 from above, this can prevent the spindle 17 from moving forward and backward, thus securely preventing any play or displacement of the lid 5.

And yet, since the walls 20, 20 formed on the fastening unit 16 of the mouth 4 are inserted between the walls 25, 25 formed on the bearing unit 24 of the lid 5 and that the fastening lever 18 is fastened to the circumferential face of the spindle 37 corresponding to the space between the walls 20, 20, it becomes possible to prevent any mutual contact between the walls 25, 25 of the bearing unit 24 and the fastening lever 18 and, therefore, avoid any direct application, to the fastening lever 18, of the stress produced at the time of turning of the lid 5, thus accurately preventing any damage to the fastening lever 18 and stably obtaining a fastening function by the fastening lever 18.

Still more, since, when the lid 5 is turned in the opening direction, around the spindle 17, the control wall 26 formed on the bearing unit comes either close to or in contact with the rear face on the top end side of the fastening lever 18 fastened to the spindle 17 and prevents the fastening lever 18 from turning in the releasing direction, this makes it impossible for the spindle 7 to be extracted from the grooves 21, 21, thus securely preventing the lid 5 from falling off.

Yet more, since an elastic member 19 such as coil spring, etc. is provided in compressed state between the opposing faces at the bottom of the fastening unit 16 and the bottom of the fastening lever 18 corresponding to the space between the walls 22, 22, in the direction orthogonal to those opposing faces (horizontal direction), the assembling and replacement of the elastic member can be performed easily and this improves workability.

In addition, in the mounting of the lid 5, as the spindle 17 held in the bearing unit 24 of the lid 5 is put in contact with the guide face 18c of the fastening lever 18 fit in the fastening unit 16 of the mouth 4, the fastening lever 18 is turned in the releasing direction and the spindle 17 is guided for insertion in the grooves 21, 21 formed in the fastening unit 16. This makes it possible to mount the lid 5 easily by simple operation with no need of turning the fastening lever 18 with the fingers Aa of hand A or an operating tool.

In the correspondence between the construction of the present invention and the above-described embodiment, while the vessel according to the present invention corresponds to pot 1 of the embodiment, and likewise, the fastening member corresponds to the fastening lever is, the urging means corresponds to the elastic member 19, and the control unit corresponds to the control wall 26 of the bearing unit 24, the present invention is not restricted to the construction of the above-described embodiment only.

While, in the above-described embodiment, mounting of the lid 5 constituting a pot 1 was presented as example, the present invention can also be applied to vessels requiring opening/closing and connecting/disconnecting of lid such as thermos bottle, rice cooker, cocking pan, electronic jar, heat-cold insulating vessel, etc. and its use is not restricted to pot 1 of the embodiment only.

Moreover, while in the embodiment the fastening unit 16 formed on the mouth 4 and the bearing unit 24 formed on the lid 5 are rotatably fit, about the same actions and effects as those of said embodiment can be obtained even when the present invention is constructed in a way to rotatably fit the bearing unit 24 formed on the mouth 4 and the fastening unit 16 formed on the lid, for example.

What is claimed is:

1. A vessel lid mounting structure comprising:
   a lid detachably mounted on a mouth formed on said vessel;
   a fastening unit having a groove formed therein;
   a bearing unit engaged with said fastening unit and formed at a periphery of said mouth;
   a spindle held in said bearing unit and inserted in said groove of said fastening unit;
   a fastening member disposed in said fastening unit for fastening said spindle inserted in said groove and for preventing extraction of said spindle; and
   an urging member provided in direction of fastening of said fastening member to said spindle; wherein
   said fastening unit comprises walls provided on both sides thereof so as to be inserted between opposing faces of walls formed on sides of said bearing unit.

2. The structure of claim 1, wherein said bearing unit comprises a control unit which comes close to an end part on a fastening side of said fastening member for fastening said spindle when said lid is turned in an opening direction, thereby to prevent said fastening member from turning in a release direction.

3. The structure of claim 1, wherein said urging means comprises an elastic member for urging said fastening member in direction of fastening of said spindle, said elastic member being mounted between opposing faces of said fastening unit and said fastening member.

4. The structure of claim 1, wherein said fastening member comprises a guide face formed at an end on a fastening side thereof for turning said fastening member in a release direction and for guiding said spindle for insertion in a direction to insert said spindle in said groove of said fastening unit.

5. A vessel lid mounting structure comprising:
   a lid detachably mounted on a mouth formed on said vessel;
   a fastening unit having a groove formed therein;
   a bearing unit engaged with said fastening unit and formed at a periphery of said mouth;
   a spindle held in said bearing unit and inserted in said groove of said fastening unit;
   a fastening member disposed in said fastening unit for fastening said spindle inserted in said groove and for preventing extraction of said spindle; and
   an urging member provided in direction of fastening of said fastening member to said spindle; wherein
   said fastening member comprises a guide face formed at an end of a fastening side thereof, for turning said fastening member in a release direction and for guiding said spindle for insertion in a direction so as to be inserted in said groove of said fastening unit.

6. The structure of claim 5, wherein said bearing unit comprises a control unit which comes close to an end part on a fastening side of said fastening member for fastening said spindle when said lid is turned in an opening direction, thereby to prevent said fastening member from turning in a release direction.

7. The structure of claim 5, wherein said urging member comprises an elastic member for urging said fastening member in direction of fastening of said spindle, said elastic member being mounted between opposing faces of said fastening unit and said fastening member.

8. A vessel lid mounting structure comprising:
   a lid detachably mounted on a mouth formed on said vessel;
   a fastening unit having a groove formed therein;
   a bearing unit engaged with said fastening unit and formed at a periphery of said mouth;
   a spindle held in said bearing unit and inserted in said groove of said fastening unit;
   a fastening member disposed in said fastening unit for fastening said spindle inserted in said groove and for preventing extraction of said spindle; and
   an urging member provided in direction of fastening of said fastening member to said spindle; wherein said fastening unit comprises a pair of parallely disposed walls with a holder rod positioned therebetween, and said fastening member comprises a hooked end portion for moving said spindle into said groove and holding said spindle therein, and a lever portion which is pivotally held by said holder rod so as to pivot there-about when said fastening member is operated to cause said spindle to be moved into said groove.

9. The structure of claim 8, wherein said bearing unit comprises a control unit which comes close to an end part on a fastening side of said fastening member for fastening said spindle when said lid is turned in an opening direction, thereby to prevent said fastening member from turning in a release direction.

10. The structure of claim 8, wherein said urging means comprises an elastic member for urging said fastening member in direction of fastening of said spindle, said elastic member being mounted between opposing faces of said fastening unit and said fastening member.

* * * * *